United States Patent [19]
Chida

[11] Patent Number: 5,953,505
[45] Date of Patent: *Sep. 14, 1999

[54] COMMUNICATION APPARATUS AND METHOD FOR READING OUT STORED FUNCTION INFORMATION IN RESPONSE TO IDENTIFYING INFORMATION

[75] Inventor: Makoto Chida, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/460,910

[22] Filed: Jun. 2, 1995

[30] Foreign Application Priority Data

Jun. 3, 1994 [JP] Japan ................................. 6-122878

[51] Int. Cl.$^6$ ............................................... G06F 15/16
[52] U.S. Cl. .............................. 395/200.58; 395/200.75; 370/475
[58] Field of Search ........................ 395/200.04, 200.08, 395/200.12, 375, 500, 800, 200.09, 200.15, 490, 491, 200.58, 200.75; 348/14, 15, 17, 13; 370/70, 73, 259, 260, 266, 270, 351, 464, 475; 364/146, 401, 406, 514 A, 131, 400, 514 R; 380/3, 4, 5; 379/118, 157, 158, 201, 202–205

[56] References Cited

U.S. PATENT DOCUMENTS

| | | | |
|---|---|---|---|
| 5,495,285 | 2/1996 | Fujioka | 348/15 |
| 5,500,672 | 3/1996 | Fujii | 348/17 |
| 5,510,829 | 4/1996 | Sugiyama et al. | 348/14 |
| 5,517,652 | 5/1996 | Miyamoto et al. | 395/800 |

*Primary Examiner*—Larry D. Donaghue
*Attorney, Agent, or Firm*—Fitzpatrick, Cella, Harper & Scinto

[57] ABSTRACT

A communication terminal includes a memory for storing various types of information related to a communication partner, for example, information that represents the functions of the communication partner and identifying information for identifying the communication partner. The terminal can discriminate a communication partner based on both a transmitted signal from communication partner transmitted during a communication operation and the identifying information stored in the memory, and can display the various information related to the communication partner in accordance with the discrimination.

30 Claims, 18 Drawing Sheets

| TERMINAL INFORMATION | | | | ID INFORMATION | | | DATA INFORMATION | | | | | |
|---|---|---|---|---|---|---|---|---|---|---|---|---|
| TERMINAL ID | USER ID | TERMINAL # OF NETWORK | ATTRIBUTION OF TERMINAL | LARGE GROUP ID | SMALL GROUP ID | DATA ID | NAME OF DATA | KIND OF MEDIA | KIND OF ATTRIBUTION | AMOUNT OF DATA | APPLICATION | TIME DESIGNATED |
| ABCD | SATO | 1234-5678 | TV CONFERENCE | II | — | — | | | | | | |
| IJKL | TANAKA | 4321-5678 | FACSIMILE | II | 2 | 0002 | | | | | | |
| IJKL | SUZUKI | 4321-5678 | MULTI-FUNCTION TERMINAL | II | 2 | — | | | | | | |
| MNOP | YAMADA | 5678-2222 | MULTI-MEDIA TERMINAL | II | 1 | — | | | | | | |
| QRST | YAMAMOTO | 5678-1111 | PERSONAL COMPUTER | I | 1 | — | | | | | | |
| MNOP | YAMADA | 1234-5678 | MULTI-MEDIA TERMINAL | | | | | | | | | |
| | | | | | | | | | | | | |

FIG.4 (a)

| INFORMATION ELEMENT | TYPE |
|---|---|
| PROTOCOL DISCRIMINATOR | MUST |
| CALL REFERENCE | MUST |
| MASSAGE TYPE | MUST |
| BEARER CAPABILITY | MUST |
| KEYPAD FACILITY | OPTION |
| CALLED PARTY NUMBER | OPTION |

SET UP MASSAGE CONTENT

FIG.4(b)

| BITS | | | | | | | | OCTETS |
|---|---|---|---|---|---|---|---|---|
| 8 | 7 | 6 | 5 | 4 | 3 | 2 | 1 | |
| 0 | 0 | 0 | BEARER CAPABILITY 0 0 0 | | | 0 | 0 | 1 |
| INFORMATION ELEMENT IDENTIFIER | | | | | | | | |
| LENGTH OF THE BEARER CAPABILITY CONTENTS | | | | | | | | 2 |
| 1 ext | CODING STANDARD | | INFORMATION TRANSFER CAPABILITY | | | | | 3 |
| 0/1 ext | TRANSFER MODE | | INFORMATION TRANSFER RATE | | | | | 4 |
| 0/1 ext | \multicolumn 0 LAYER 1 IDENT. | | USER INFORMATION LAYER 1 PROTOCOL | | | | | 5* |
| 0/1 ext | SYNCH./ ASYNCH. | NEGOT. | USER RATE | | | | | 5a* |
| 1 ext | \multicolumn 0 LAYER 2 IDENT. | | USER INFORMATION LAYER 2 PROTOCOL | | | | | 6* |
| 1 ext | \multicolumn 0 LAYER 3 IDENT. | | USER INFORMATION LAYER 3 PROTOCOL | | | | | 7* |

BEARER CAPABILITY
INFORMATION ELEMENT

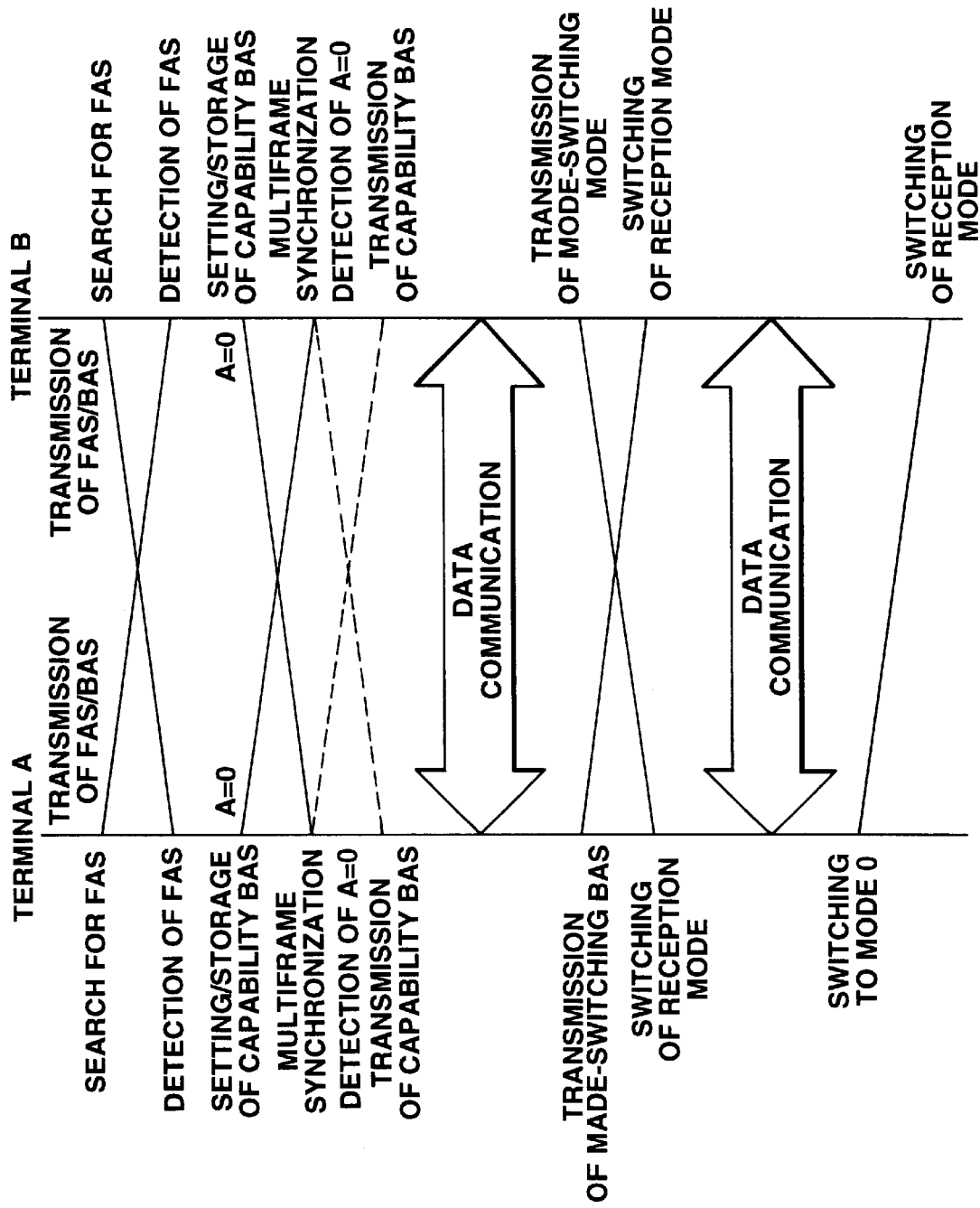

FIG.8(a)

| BIT NUMBER | b0 | b1 | b2 | b3 | b4 | b5 | b6 | b7 |
|---|---|---|---|---|---|---|---|---|
| CONTENTS OF BAS | ATTRIBUTE ||| ATTRIBUTE VALVE |||||

FIG.8(b)

| b0 | b1 | b2 | COMMAND OR CAPABILITY |
|---|---|---|---|
| 0 | 0 | 0 | VOICE-ENCODING COMMAND |
| 0 | 0 | 1 | TRANSFER-RATE COMMAND |
| 0 | 1 | 0 | IMAGE COMMAND AND OTHER COMMANDS |
| 0 | 1 | 1 | DATA COMMAND |
| 1 | 0 | 0 | TERMINAL CAPABILITY 1 |
| 1 | 0 | 1 | TERMINAL CAPABILITY 2 |
| 1 | 1 | 0 | UNDEFINED |
| 1 | 1 | 1 | ESCAPE CODE |

[TCP HEADER FORMAT]

[ IP HEADER FORMAT ]

FIG.11

| TERMINAL INFORMATION | | | | ID INFORMATION | | | DATA INFORMATION | | | | | |
|---|---|---|---|---|---|---|---|---|---|---|---|---|
| TERMINAL ID | USER ID | TERMINAL # OF NETWORK | ATTRIBUTION OF TERMINAL | LARGE GROUP ID | SMALL GROUP ID | DATA ID | NAME OF DATA | KIND OF MEDIA | KIND OF ATTRI-BUTION | AMOUNT OF DATA | APPLI-CATION | TIME DESIGNATED |
| ABCD | SATO | 1234-5678 | TV CONFERENCE | II | — | — | | | | | | |
| IJKL | TANAKA | 4321-5678 | FACSIMILE | II | 2 | 0002 | | | | | | |
| IJKL | SUZUKI | 4321-5678 | MULTI-FUNCTION TERMINAL | II | 2 | — | | | | | | |
| MNOP | YAMADA | 5678-2222 | MULTI-MEDIA TERMINAL | II | 1 | — | | | | | | |
| QRST | YAMAMOTO | 5678-1111 | PERSONAL COMPUTER | I | 1 | — | | | | | | |
| MNOP | YAMADA | 1234-5678 | MULTI-MEDIA TERMINAL | | | | | | | | | |
| | | | | | | | | | | | | |

FIG.12

| ID INFORMATION | | | DATA INFORMATION | | | | | |
|---|---|---|---|---|---|---|---|---|
| LARGE GROUP ID | SMALL GROUP ID | DATA ID | NAME OF DATA | KIND OF MEDIA | KIND OF ATTRIBUTION | AMOUNT OF DATA (BYTE) | APPLICATION | TIME DESIGNATED |
| I | 1 | 0001 | REPORT A | DATA | TEXT | 1K | WORD PROCESSING | |
| | | 0002 | NUMERICAL DATA A | DATA | NUMERICAL | 0.5K | TABLE CALCULATE | |
| | | 0003 | GRAPH A | IMAGE | GRAPH | 2K | TABLE CALCULATE | |
| II | 1 | 0001 | REPORT B | DATA | TEXT | 2K | DTP | |
| | | 0002 | VIDEO B | IMAGE | MPEG | 100K | PRESEN-TATION | |
| | | 0003 | AUDIO B | AUDIO | MPEG AUDIO | 50K | PRESEN-TATION | |
| | 2 | 0001 | REPORT C | DATA | TEXT | 2K | DTP | |
| | | 0002 | PICTURE C | IMAGE | STILL IMAGE | 10K | (FACSIMILE) | |

COMMUNICATION APPARATUS AND METHOD FOR READING OUT STORED FUNCTION INFORMATION IN RESPONSE TO IDENTIFYING INFORMATION

BACKGROUND OF THE INVENTION

1. Field of the Invention

This invention relates to a communication apparatus and method, and more particularly to a communication apparatus and method which are suitable for communicating various kinds of information.

2. Description of the Related Art

In the case of using a conventional analog telephone circuit as a communication apparatus, the telephone itself can transmit only voice data, and all types of data can be transmitted only at a low speed.

Recently, however, as a result of progress in communication technology, semiconductor technology and optical technology, digital networks have been provided, and it has become possible to transmit large quantities of data at high speed.

Such digital transmission has advantageous features in that, for example, the same level of data quality can be maintained without degradation during data transmission. Also, a particular transmission channel corresponding to the characteristics of the kind of transmitted data is not required, and therefore all media can be dealt with. Hence, it has become possible to perform transmission between complex media terminals and, as a result, multimedia communication apparatuses have appeared in which a telephone can simultaneously transmit images as well as voice data.

International standardization by the ITU-T and the like has intended to ensure that mutual communication can be performed between terminals which deal with voice data and image data, and service provisions, protocol provisions, and provisions for the configuration of multimedia multiplexed frames for AV (audiovisual) services, such as video telephones, video conferences, and the like using a digital network, have been announced as H. 320, H. 242, H. 221, and the like recommended by the ITU-T.

In H. 221, the frame configuration, exchange of terminal capabilities, and code allocation of an FAS (frame alignment signal) and a BAS (bit allocation signal) in a communication mode in AV series for 64 Kbits to 1920 Kbits are defined.

In H. 242, protocols for the exchange of capabilities between AV terminals using a BAS, the switching of the communication mode, and the like are defined. In H. 320, system aspects for all AV services are defined.

In the above-described recommendations, methods are provided for performing the communication of multimedia, comprising images, voice, data, and the like between terminals according to procedures, such as a sequence of in-channel exchanges of terminal capabilities using a BAS, a mode-switching sequence by assigning a communication mode and the like after setting of an end-to-end physical connection and in-channel establishment of synchronization using a FAS.

However, methods for changing the capabilities of a terminal in accordance with a new situation, and methods of selecting a communication mode within the range of exchanged capabilities, are not provided.

In multimedia communication, the information transfer speed for voice information is determined by assigning a voice-encoding method, and the transfer speed for data information is determined by assigning the value of the transfer speed when data information is transferred. The transfer speed for image information is obtained by subtracting the transfer speed for voice information and the transfer speed for data information from the set information transfer speed of the entire communication channel.

However, such conventional communication apparatus have certain problems.

For example, a first user at one terminal can send document information in a first communication to another terminal, and the first user at the one terminal can talk about the document with a second user at another terminal in a second communication. In this situation, the second user will have to be careful to keep any copy of the document.

If the second user loses the document, the second user has to have the first user send the document again.

Therefore the conventional apparatus is not always easy to use.

The above example refers to document information and voice data transmitted while talking, but the above problem is not limited to document and voice data. For other media, e.g. image data, motion image data and text data, similar problems will occur.

Besides, a multimedia communication apparatus has many functions, e.g. facsimile transmission, voice data transmission, image data transmission, and so the apparatus may not send information that describes all the functions of the apparatus.

Therefore, each terminal has to request the communication partner's terminal to send the information, and it can take a relatively long time to send the information.

SUMMARY OF THE INVENTION

It is an object of the present invention to provide a communication apparatus and method which solve the above-described problems.

Another object of the present invention is to provide a method and apparatus for promptly getting detailed information that shows the functions of a partner's terminal.

Still another object of the present invention is to provide a method and apparatus for getting prompt information that shows the multimedia functions of a partner's terminal.

Another object of the present invention is to improve the efficiency of communication.

Still another object of the present invention is to prevent wasting time in communication.

Still another object of the present invention is to eliminate wasting time in interrupting and transmitting communications which are needed to recover lost or missed transmitted data.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 4(a) and 4(b) are diagrams showing a calling set message and communication ability;

FIG. 6 is a diagram illustrating in-channel control in a B channel;

FIGS. 8(a) and 8(b) are diagrams illustrating the bit structure of a BAS;

FIG. 11 is a diagram showing a data management table;

FIG. 12 is a diagram showing ID and data information;

DETAILED DESCRIPTION OF THE PREFERRED EMBODIMENT

Figure 1:
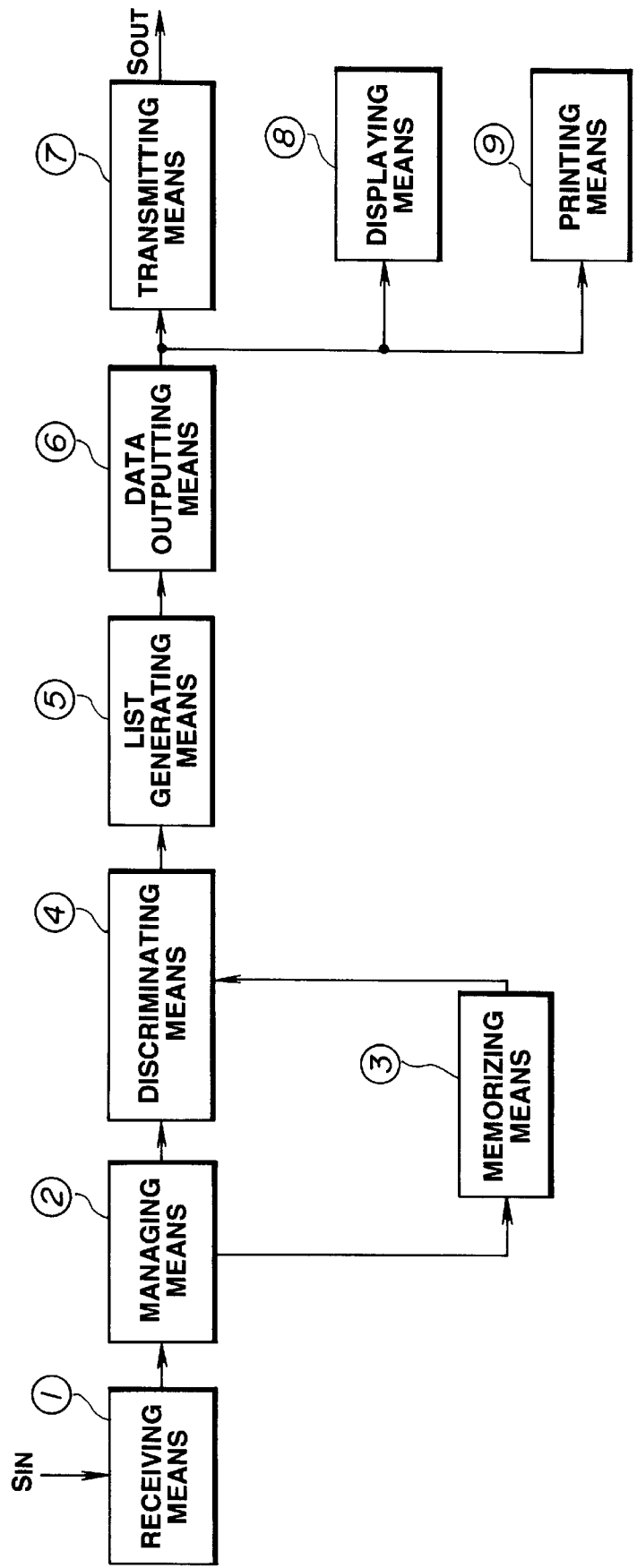
FIG. 1 is a block diagram of an apparatus of a preferred embodiment of the present invention.

Preferred embodiments of this invention will be explained as follows by referring to the drawings.

FIG. 1 is a block diagram of the first embodiment of the present invention.

Referring to FIG. 1, the reference numbers indicate the following elements. 1 is a receiving means for receiving an input signal $S_{IN}$ containing information from another terminal, and 2 is a managing means for managing data in the input Signal $S_{IN}$ by relating it to identification information of the other terminal.

3 is a memorizing or storage means for storing the identification information.

4 is a discriminating means for discriminating between the data stored by the storage means and the information sent by the other terminal that is connected for communication.

5 is a list generating means for generating a list of data in accordance with a coincidence between stored data and sent information.

6 is a data outputting means for outputting the list generated by the list generating means 5.

7 is a transmitting means for transmitting the output of the data outputting means 6.

8 is a displaying or display means for displaying data output by the data outputting means 6.

9 is a printing means for printing data output by the data outputting means 6.

Figure 2:
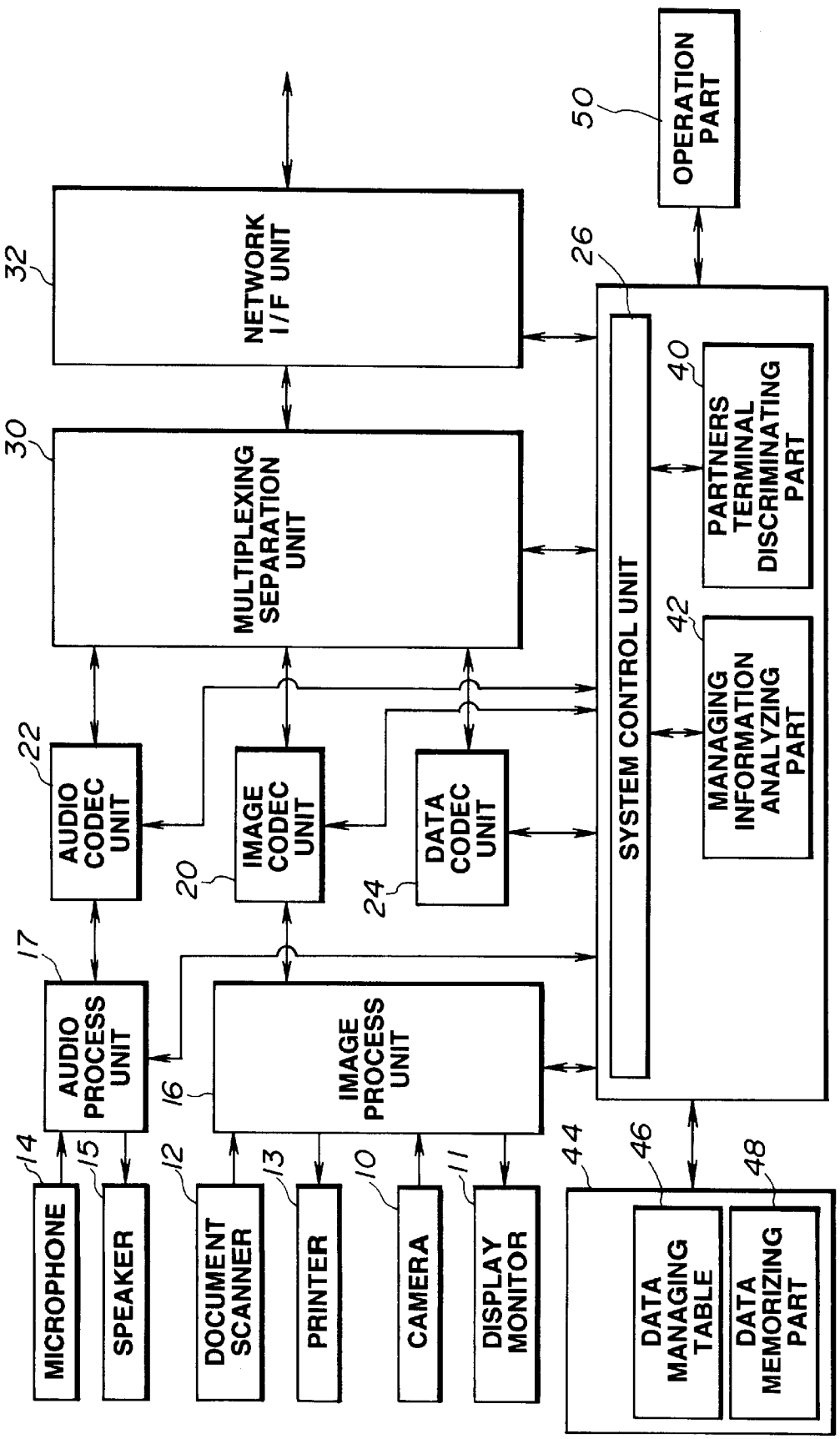
FIG. 2 is a more detailed block diagram showing the configuration of the apparatus according to the embodiment of the present invention.

In FIG. 2, a camera 10 can be used to photograph, for example, a group of people attending a meeting. A document scanner 12 photographs a document, such as a drawing or the like, for the meeting. An image display monitor unit 11 comprises a CRT (cathode-ray tube), a liquid-crystal display unit, or the like. An image process unit 16 selects one of the images output from the camera 10 and the document scanner 12 for transmission, and supplies the image display monitor unit 11 with an image obtained by selecting and synthesizing images output from the camera 10 and the document scanner 12 and received images in order to display the image. An image codec unit 20 encodes an image signal to be transmitted, which is output from the image process unit 16. The unit 20 performs band compression of the image signal input from the unit 16 by performing one or more of movement compensation, frame skipping, interframe compensation, intraframe compensation, DCT, vector quantization transform, and the like. H. 261 recommended by the ITU-T is an encoding method which can transmit data at 64 Kbps at a basic interface of an ISDN. Also shown are a microphone 14 and a speaker 15. An audio process unit 17 performs an interfacing operation with the microphone 14 and the speaker 15. The audio process unit 17 not only switches of the voice input/output for the microphone 14 and the speaker 15, but also performs adjustment of the sound level, echo cancel processing, and the processing for generating tones, such as a dial tone, a ringing tone, a busy tone, a call-reception tone, or the like. A audio codec unit 22 encodes a voice signal to be transmitted from the audio process unit 17. The codec unit 22 decodes a received encoded voice signal, and outputs the decoded signal to the unit 17. The transmission speed and the encoding method comprise 64 Kbps PCM (A-law), 64 Kbps PCM ($\mu$-law), 7 KHz audio (SB-ADPCM), 32 Kbps ADPCM, 16 Kbps (for example, LD-CELP), 8 Kbps, or the like.

A system control unit 26 controls the entire apparatus. The system control unit 26 stores information relating to other terminals in a storage unit 44 therein.

A network interface unit: 32 connects the apparatus to a communication network, such as an ISDN or the like. A multiplexing/separation unit 30 multiplexes image information, voice information, data information and control information to be transmitted in accordance with the H. 221 format, supplies the network interface unit 32 with the resultant data, and separates received information supplied from the network interface unit 32 into image information, voice information, data information and control information.

The storage unit 44 in unit 26 comprises a large-capacity memory or data memorizing part 48 for storing, during a recording operation, information including encoded image data, encoded voice data, and the like received from each terminal in communication, or information stored in the user's own terminal as response messages to be transmitted in recording operations during his absence.

The system control unit 26 includes a managing information analyzing part 42 and a communication partner's terminal discriminating part 40.

The system control unit 26 transfers multiplexed information or network information from multiplexing/separation unit 30 or network I/F unit 32 to the managing information analyzing part 42. The unit 26 accesses the storage unit 44 in accordance with an analyzed result by the part 42. The unit 26 also transfers a communication partner's discrimination information to the partner's terminal discriminating part 40 and stores the data into the storage unit 44.

An operation part 50 inputs various kinds of instruction information to the system control unit 26, and comprises, for example, a keyboard, a touch panel, a digitalizer and a pointing device, such as a mouse or the like.

The flow of an image signal and a voice signal in the apparatus shown in FIG. 2 will now be briefly described.

The image data from the camera 10 is written into an internal memory within the image process unit 16. The image data written into the internal memory is processed by a spatial filter process, a noise reduction process, a format conversion process, and/or color space conversion process and after that the processed image data is transferred to the image codec unit 20.

The TV phone captures the moving image data from the camera 10 into the internal memory as a stationary image and transfers it to the system control unit 26.

The image data from the document scanner 12 is processed and written into the internal memory by the image process unit 16. After the image data is written, it is transferred to the image code unit 20 or system control unit 26.

The image process unit 16 generally operates on the image data transferred from outside to perform a format conversion process and/or a color space conversion process. The unit 16 operates on the transferred stationary image data to perform a color space process and a resolution conversion process for the display monitor 11. The unit 16 operates on the transferred image data to perform a color space process and a resolution conversion process and to output a processed image signal to the printer 13. The unit 16 operates on the moving image data to perform a color space process/ resolution conversion process and a spatial filter process to suit it to the monitor 11 and to output processed data to the monitor 11.

The image process unit 16 also operates on graphic data from the system control unit 26 to perform similar processes and to output processed data to the monitor 11 or the printer 13.

In a synthesis method, code data is allocated to either stationary image data or moving image data when graphic data is written in a text VRAM. When code data other than the allocated code data is read, the image process unit 16 transfers the graphic data to the image codec unit 20. When the allocated code data is read, stationary image data or moving image data is transferred to the image codec unit 20. Thus, images are synthesized.

The conversion of code data into color data is performed using a color look-up table (not shown) included in the unit 20. Graphic data corresponding to color data, whose correspondence with code data is provided in the look-up table, is output for each input of code data.

A voice signal obtained from the microphone 14 is input to the audio codec unit 22 via the audio process unit 17. The unit 22 supplies the multiplexing/separation circuit 30 with encoded voice data.

The multiplexing/separation unit 30 multiplexes encoded signals from the image codec unit 20, the audio codec unit 22, and a control command received via a data code unit 24 from the system control unit 26, and outputs the resultant signal to the network interface unit 32.

A signal received from the communication network is supplied from the network interface unit 32 to the multiplexing/separation unit 30. The multiplexing/ separation unit 30 separates a encoded image signal, an encoded voice signal, a data signal (of text, a document, or the like), and a control command from the received signal, supplies the encoded image signal to the image codec unit 20 and supplies the data and the control command to the system control unit 26.

The image codec unit 20 decodes the encoded image signal and supplies the image process unit 16 with the resultant signal. The image process unit 16 selects and synthesizes image signals from the camera 10 and the document scanner 12, and the image signal decoded by the image codec unit 20, and supplies the monitor 11 with the resultant signal. The image process unit 16 performs, for example, picture-in-picture display, or insertion of the obtained image in the corresponding 10 window in a window display system, as synthesis processing. Thus, the input image and/or the received image (including an image recorded in the absence of the operator) are displayed on the picture surface of the display monitor 14.

The audio codec unit 32 decodes the encoded voice signal and supplies the resultant signal to the speaker 15, via audio process unit 17. It is thereby possible to hear voice data (including voice data recorded during the operator's absence) from the communication partner.

Each of the image codec unit 20 and the audio codec unit 22 comprises a plurality of kinds of encoding circuits corresponding to various kinds of encoding methods, and performs an encoding operation using a corresponding encoding circuit in accordance with assignment of an encoding method.

H. 261, which is recommended by the ITU-T, MPEG (Motion Picture Image Coding Experts Group), or JPEG (Joint Photographic Experts Group) may be used as the encoding method of the image codec unit 20.

The above-described encoding methods will now be described. However, the encoding method of the image codec unit 22 is not limited to one or even all of these methods, but other image encoding methods may, of course, be used.

H. 261, already recommended by the ITU-T, is an advantageous image compression method for communication. If a video telephone apparatus conforms to this recommendation, that apparatus can also communicate with any other video telephone apparatus which conforms to any other recommendation.

A plurality of different standards, such as NTSC, PAL, digital television standards, and the like, are present for video signals. Hence, in H. 261, a video signal format which is common throughout the world is adopted, so that communication can be performed between any two apparatuses in the world. This format is termed a CIF format, in which the number of samples equals 352 pixels×288 lines for luminance Y, and equals 176 pixels×144 lines for chrominances Cr and Cb. A quarter of the CIF format is termed a QCIF format, in which the number of samples equals 176 pixels×144 lines for luminance Y, and equals 88 pixels×72 lines for chrominances Cr and Cb. A GOB format is defined such that the number of samples equals 176 pixels×48 lines for luminance Y, and equals 88 pixels×24 lines for chrominances Cr and Cb, and corresponds to 1/12 of the CIF format and 1/3 of the QCIF format.

Compression methods comprise, for example, intraframe encoding which utilizes such facts as, for example, that there is a strong correlation between pixels in an image taken from the natural world, low-frequency components are dominant and high-frequency components are in the minority. Data within a frame is divided into blocks of 8 pixels×8 pixels, and is subjected to two-dimensional DCTL. Interframe encoding is also used, in which the difference between frames is obtained when there is a strong correlation between image blocks at the same position of the preceding frame and the current frame, and each block of 8 pixels ×8 pixels is subjected to two-dimensional DCT using the difference value. Also used is movement compensation in which the movement of an analogous image block from the preceding frame to the current frame is detected, and only information relating to the amount and the direction of the movement is transmitted without transmitting the image data itself, whereby the amount of data generated is reduced. Zero-run-length encoding utilizes the fact that the coefficient value for each frequency after DCT is generated in low-frequency regions, but is rarely generated in high-frequency regions where zero values will therefore continue. Also used are quantization in which the amount of data generated is adjusted by changing the width of quantization steps for data in accordance with the amount of data generated, variable-length encoding in which the amount of generated data is reduced by allocating short code values to data patterns having a high frequency of generation and allocating long code values to data patterns having a low frequency of generation, and frame skipping in which part of the image data is omitted.

As described above, a plurality of compression techniques can be combined, so that moving images can be transmitted even in communications having a low transfer rate.

In an interframe encoding mode (hereinafter termed an INTER mode), a high compression ratio can be achieved when the correlation between frames is high. Hence, when the correlation between frames has at least a predetermined level, the INTER mode is adopted. When the correlation between frames has a level less than the predetermined level, an intraframe encoding mode (hereinafter termed an INTRA mode) is adopted. The degree of correlation is determined, for example, from the degree of movement of an object between frames.

In the INTER mode, quantization errors representing the difference between quantization at the transmission side and quantization at the reception side are accumulated at the terminal of the reception side, and the value of the accumulated errors is large when the quantization step size is coarse. Hence, in general, INTRA modes are periodically disposed in units of blocks, while INTRA modes are periodically disposed in units of blocks. INTRA modes are also periodically disposed in order to prevent the propagation of transmission errors. It is considered to be desirable to provide frames at an appropriate interval using only INTRA processing. This processing is called entire INTRA processing. According to the entire INTRA processing mode, it is possible to prevent decoding errors and quantization errors and to refresh the picture surface.

Next, a description will be provided of MPEG. MPEG provides an image encoding method used mainly for digital storage media for which standardization is under way by the ISO (International Organization for Standardization)/IEC (International Electrotechnical Commission).

MPEG-1 has already been recommended, and the standardization of MPEG-2 is now under way.

The encoding method of MPEG is basically similar that of the H. 261 recommendation, but since MPEG is provided for storage media, it greatly differs from H. 261, which is provided for communication, in time base processing. More specifically, various kinds of approaches are devised in order to respond to requests for quick feeding, rewinding, reproduction in the middle of an item, and reverse reproduction.

First, this method defines data in units of a GOP (group of pictures) comprising a plurality of frames N =the number of frames of a GOP, and N parameters are set. A sequence header can be added to a GOP. By reproducing data in units of a GOP, it is possible to perform, for example, reproduction from the middle.

A plurality of frame types are present: I (Intraframe)-Picture, P (Predictive)-Picture, and B (Bidirectional)-Picture are defined and M (=periods of I-Picture and P-Picture) parameters are set.

In H. 261, I-Picture and P-Picture frames are used, and prediction only in the forward direction is used in the time base processing. On the other hand, in MPEG, all of the above-described three frame types are used, so that it is possible to perform decoding based on prediction in two directions in the time base processing, and to perform high-speed decoding by shortening the time base. It is thereby possible to deal with reverse reproduction, quick feeding, and the like. The size of the picture frame is not fixed, and can be changed in accordance with the application.

Next, a description will be provided of JPEG. JPEG provides an encoding method for color still-picture data made by cooperation of the ITU-T and ISO/IEC, and has already been recommended. JPEG is the same as the above-described H. 261 and MPEG in that the transform encoding method comprises two-dimensional DCT, and differs from these standards in that methods for utilizing characteristics of a still picture are adopted.

First, Y (luminance) components and C (chrominance) components of the DCT coefficients are quantized using different quantization matrices. DC components of the DCT coefficients are subjected to Huffman coding for DC components using each predictive value (DPCM) between the DC component of a block and the DC component of the block immediately to the left to that block. AC components of the DCT coefficients are subjected to Huffman coding for AC components after performing zigzag scanning of the DCT coefficients and performing zero-run-length encoding.

Quantization matrices and a Huffman-coding table can be freely set. Encoding/decoding can be performed by transferring the set values from the transmission side to the reception side in advance. It is thereby possible to perform the encoding which is most suitable for the target still picture from the viewpoint of improving the picture quality, the encoding efficiency, and the like.

This method also includes the function of sequentially displaying images from rough images to very fine images for a soft copy display on a display device. There are known a display method using sequential encoding and a display method using progressive encoding according to the sequence of display. In JPEG, the latter method is adopted as an extension function, so that the field of application can be widened.

In the progressive encoding method, resolution and gradation are sequentially increased hierarchically from an image having low resolution and gradation in order to reach the final picture quality.

There are three kinds of progressive encoding methods, i.e., an SS (spectral selection) method, an SA (successive approximation) method, and a hierarchical method.

In the SS method, DCT coefficients are not transmitted all at once, but are transmitted after being divided into a plurality of blocks. Therefore, DCT coefficients are subjected to stepwise encoding in the direction of frequency.

In the SA method, a selected number of bits from the most significant bit in the DCT coefficients are encoded for all blocks within an image, and remaining lower bits are sequentially encoded and transmitted from the upper bits at subsequent scanning operations. Therefore, the DCT coefficients are subjected to stepwise encoding in the order of accuracy.

In the hierarchical method, the size of an image is pyramidally reduced by powers of two in the vertical and horizontal directions, then compression encoding, such as DCT or the like, is performed in each pyramidal hierarchy, and the size of the image is sequentially increased. First, data of the most reduced image is encoded. Then, the difference between data of an image obtained by magnifying a decoded image of the encoded image twice and data or an image obtained by reducing the input image to the same size is subjected to DCT. This processing is repeated until the size of the image equals the size of the input image. This method has the advantage in that terminals having different resolutions can be dealt with.

Another encoding method is a two-dimensional DPCM encoding method (without DCT) which is a spatial encoding method. In this method, a predictive calculation operation using a target pixel and three surrounding pixels to be used for prediction is used as a predictive function. There are eight predictive calculation operations.

Figure 3:
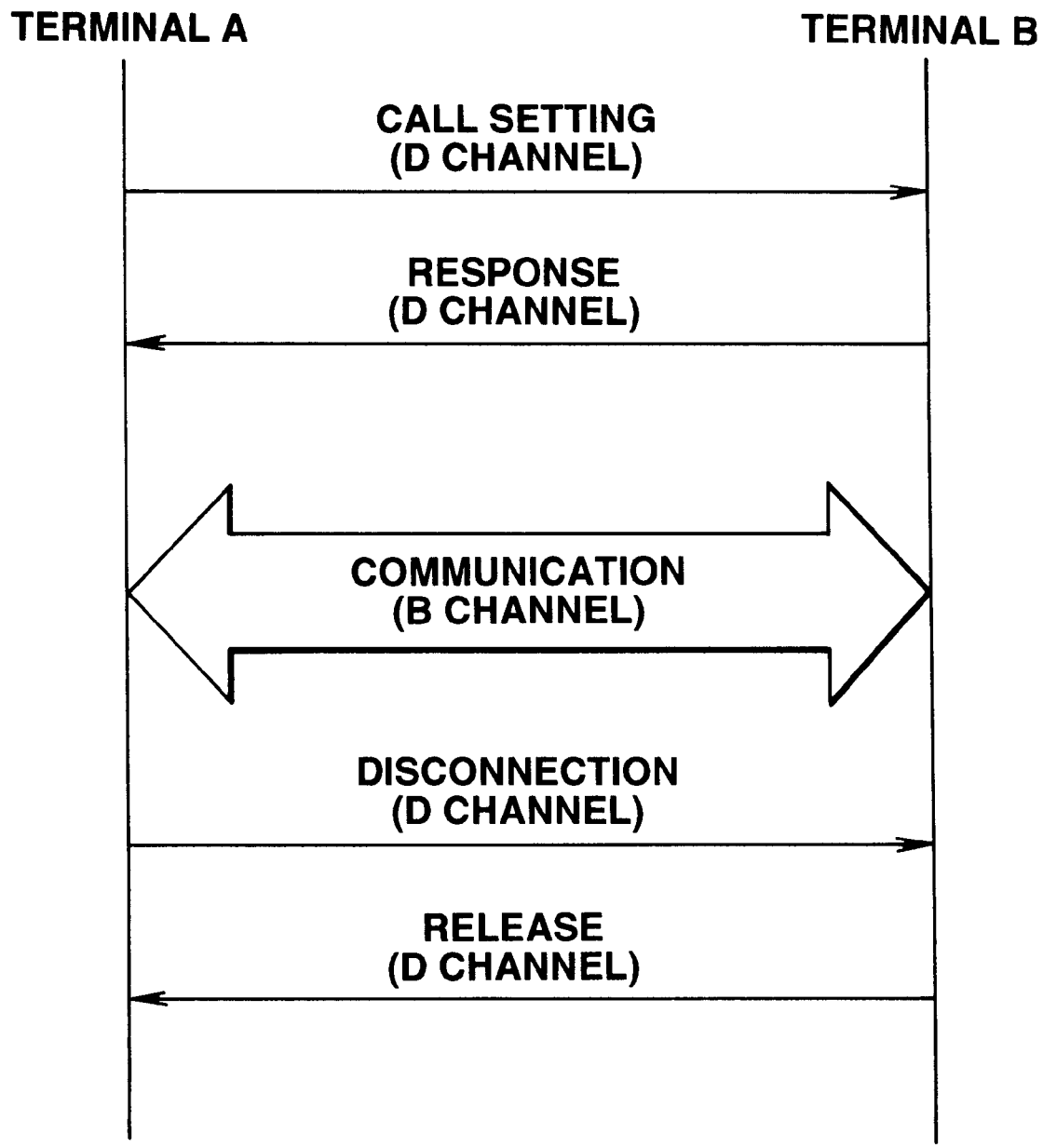
FIG. 3 is a diagram illustrating a procedure from call setting to release in the apparatus shown in FIG. 2.
Figure 5:
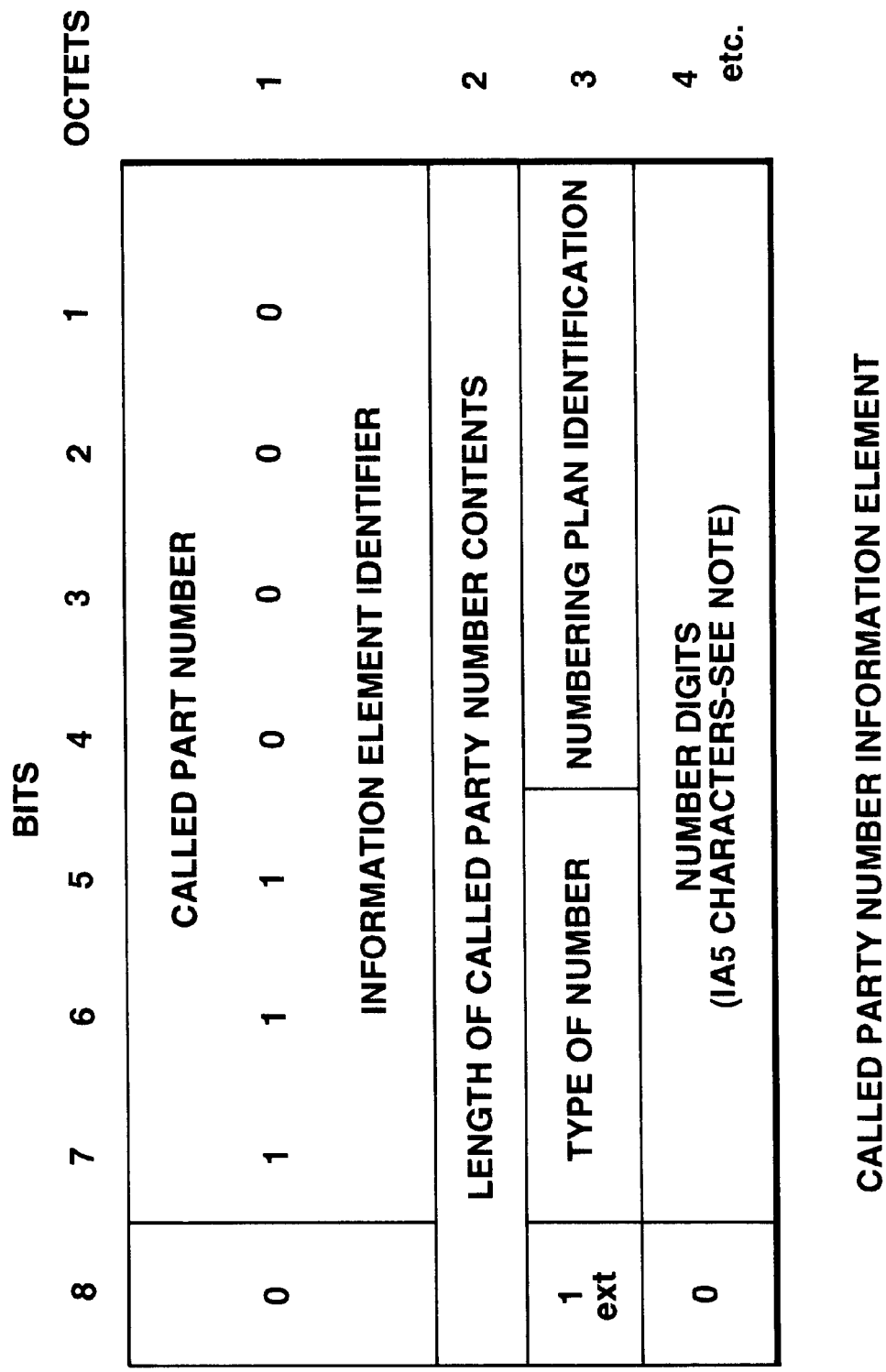
FIG. 5 is a diagram showing an arrival-number.

Next, a description will be provided of the negotiation of capabilities of terminals and a method of changing the capabilities, illustrated for an ISDN. In the ISDN, as shown in FIG. 3, a call is effected using an outband signal (i.e., a D channel). As shown in FIG. 3, after terminal A sets a call to terminal B, and response is sent from terminal B to terminal A, communication in a B channel is started. After communication in the B channel is started, packet communication is available through the D channel. As shown in FIG. 4, the called party number is added as an optional code. By using the arrival number (FIG. 5) it is possible to transmit the terminal number. The "bearer capability" is provided to make it possible to distinguish between "audio", "unlimited digital" and "3.1 kHz audio".

Although the D, H0 or H1 channels can also be used as the communication channel, a description will now be provided of only B channel communication.

To use the B channel, which has been set for communication in the above-described manner, and in conformance with the recommendation H. 242, in-band signal procedures are executed in the B channel as shown in FIG. 6, in which the capacity of the B channel is allocated to a data unit and a control unit, and the control unit controls communication.

Such control is termed in-channel control. Control bits are needed in the B channel for performing the in-channel control. The frame configuration of the structure of the B channel is provided by the recommendation H. 221.

Figure 7A:
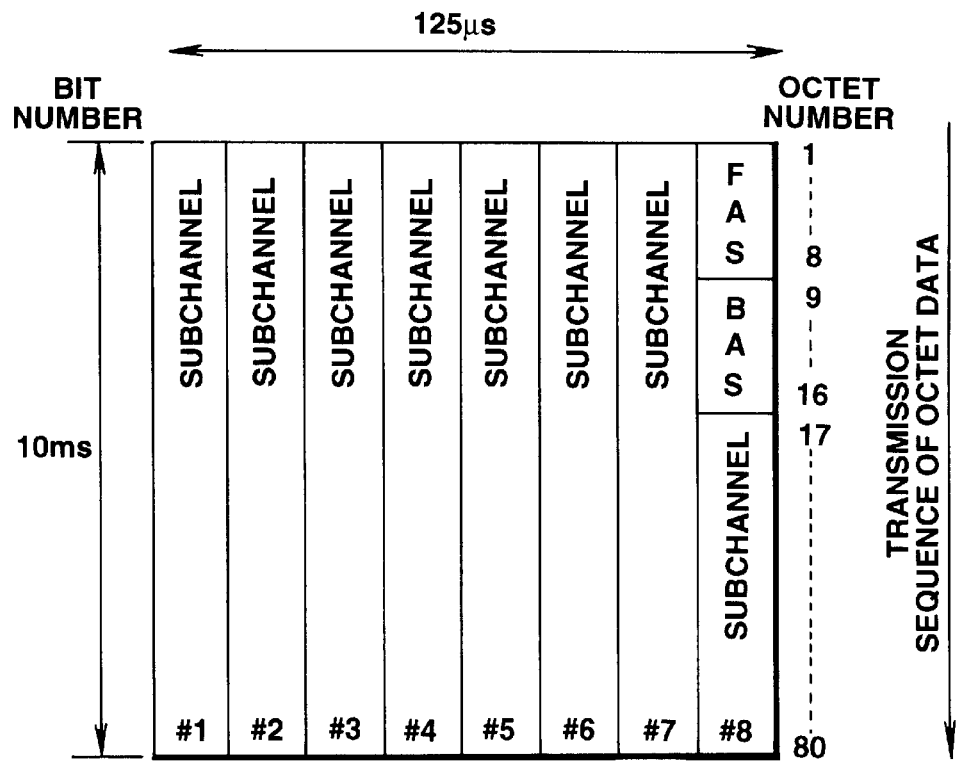
FIGS. 7(a) through 7(c) are diagrams illustrating the multiframe structure of provision H. 221.
Figure 7B:
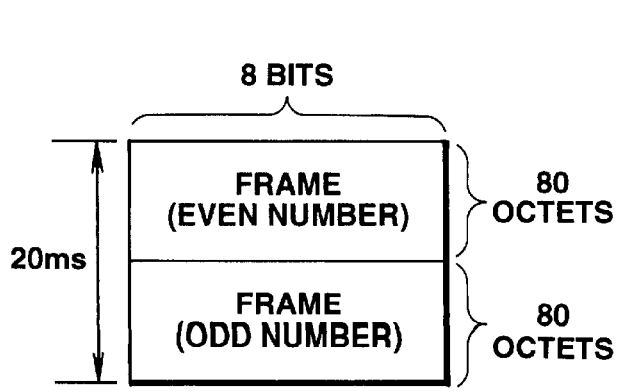
Figure 7C:
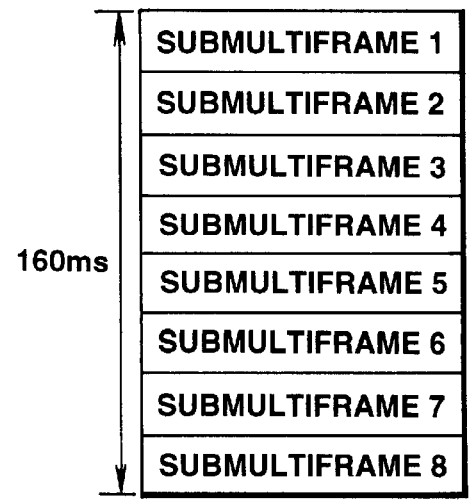

The frame configuration of the structure of the B channel for executing the in-channel control is shown in FIGS. 7(a) through 7(c). FIGS. 7(a) through 7(c) illustrate the multiframe structure for the B channel, having a transfer rate of 64 Kbps.

This multiframe structure s configured by 1 frame=80 octets as shown in FIG. 7(a), 1 submultiframe=2 frames as shown in FIG. 7(b), and 1 multiframe=8 submultiframes as shown in FIG. 7(c), based on 1 octet/125 µsec. Subchannels #1 through #8 nominally having a transfer rate of 8 Kbps are defined in the direction of bits. However, the transfer rate of the #8 subchannel is 6.4 Kbps, and an FAS and a BAS are inserted as control bits. According to the FAS and BAS, the in-channel control of the B channel can be performed.

The FAS is used for frame synchronization and multiframe synchronization. The BAS is used for the exchange of information relating to the capabilities of the terminals, or the setting of capabilities, which is necessary for determining the multiplexing method for subchannels and the like. The BAS can be switched at every submultiframe (20 µsec) even during communication.

In-band signal procedures shown in FIG. 6 will now be briefly described. When the B channel is enabled for communication, both terminal A and terminal B transmit FASs. The capabilities of the terminals at that time correspond to mode 0 at the initial state (a mode only for audio, FAS and BAS). The FAS is searched for at the communication partner's terminal, which transmits data by setting A in the bit configuration within the BAS shown in FIG. 8(a) to "0" when conditions for establishing frame synchronization provided in H. 242 are satisfied. When the terminal receives A=0, it is confirmed that frame synchronization has been established at the terminal of the communication partner.

Thereafter, the transmission capabilities of the user's own terminal are transmitted to the terminal of the communication partner using a BAS, whereby the capabilities of the two terminals in communication are confirmed. This establishes the exchange of transmission capabilities.

If the two terminals are enabled for communication at that time, the communication of data is started. When one of the capabilities of a terminal must be changed, the desired capability of the terminal is transmitted as a command using a BAS. Communication of data is started after the communication partner's terminal has completed the setting of the capability.

Transmission and reception are independent of each other in data communication, and the establishment of synchronization and the setting of capabilities of terminals are separately effected. Accordingly, synchronization may occur in one direction, or the kind of data may differ in transmission and reception.

In order to disconnect a call after data communication has been completed, first the terminal intending to disconnect the call (terminal A in the case of FIG. 6) provides mode 0 using a BAS. The in-channel control of the B channel thereby returns to the initial state. Then, as shown in FIG. 3, disconnection and release are performed in the outband procedure for the D channel, whereby the entire procedure of communication is completed.

FIGS. 8(a) and 8(b) illustrate the bit configuration within a BAS. As shown in FIG. 8(a), three significant bits represent attributes, and the remaining five bits represent the values of the attributes. FIG. 8(b) illustrates the types of attributes, which comprise, for example, a transfer rate, the kind of code, and parameter values peculiar to respective media or information.

Control information (a BAS), audio data from the audio codec unit 22, and image data from the image codec unit 20, which are all generated by the system control unit 26 in the above-described manner, are multiplexed by the multiplexing/separation unit 30 to be generated as data having the H. 221 format, and the resultant data is transmitted to the network interface unit 32.

Data having the H. 221 format received from the B channel is separated into control information (comprising an FAS and a BAS) and data of respective media (audio, image and data) by the multiplexing/separation unit 30. Voice data, image data and control information are transferred to the audio codec unit 22, the image codec unit 20 and the system control unit 25, respectively.

In a local network, a seven layer protocol is performed for communication. The seven layers include a physical layer, data link layer, network layer, transport layer, session layer, presentation layer, and application layer, in order from the lowest layer.

Of those layers, the physical layer is used for connecting between terminal and network physically.

The network layer is used for connecting between terminals connected to the network. The transport layer is for connecting a communication line to partner's terminal through the network layer by providing logical sockets that are virtually provided on the communication line.

Figure 10:
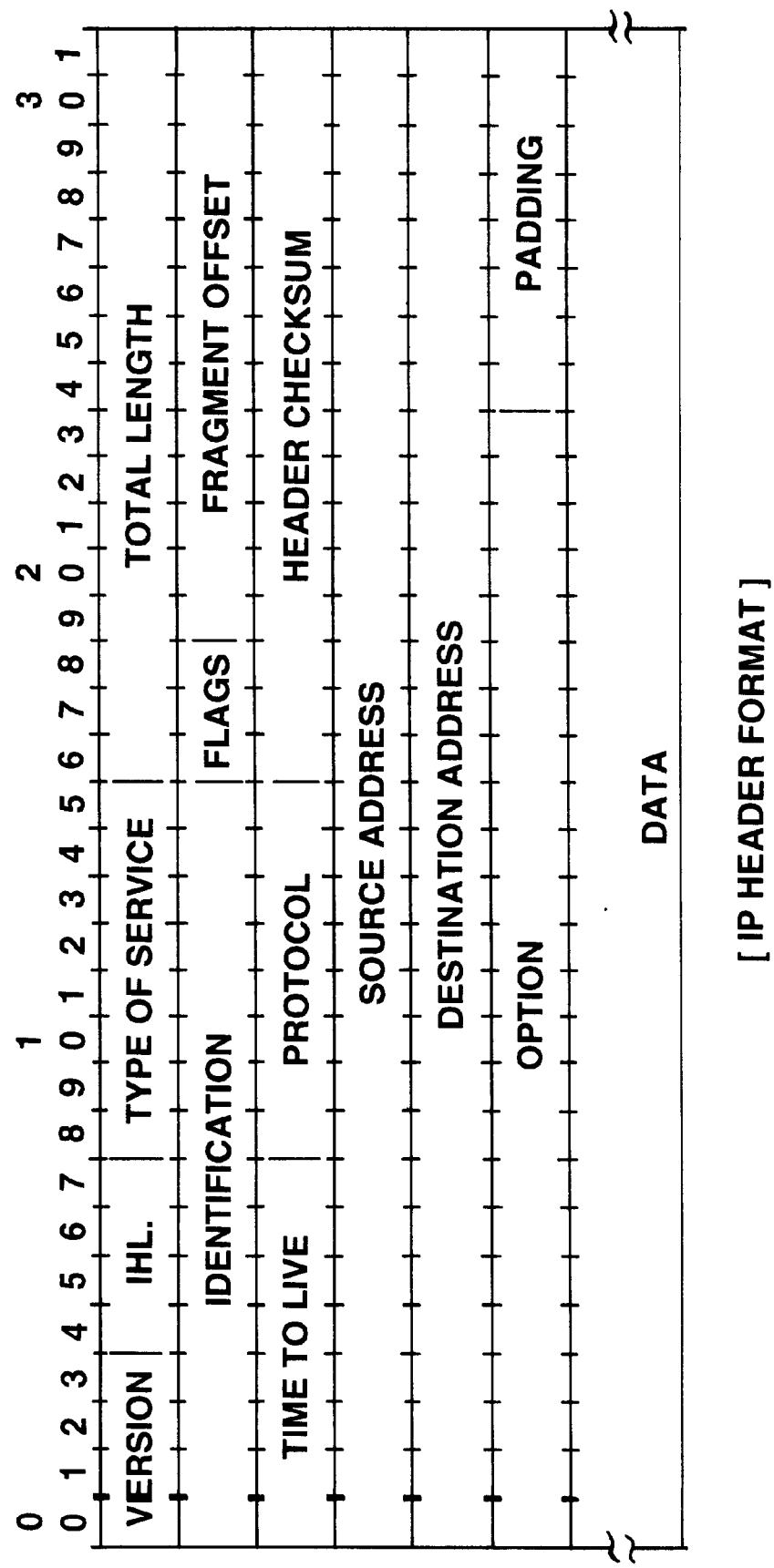
FIG. 10 is a diagram showing a bit allocation of IP.

In the network layer, each terminal has a terminal number. For instance, in IP (Internet Protocol) the terminal number is defined by a network number that defines a local network and by a host number that defines a host (FIG. 10). The host number is shown as a source host number or destination host number. This address is called the internet address.

Figure 9:
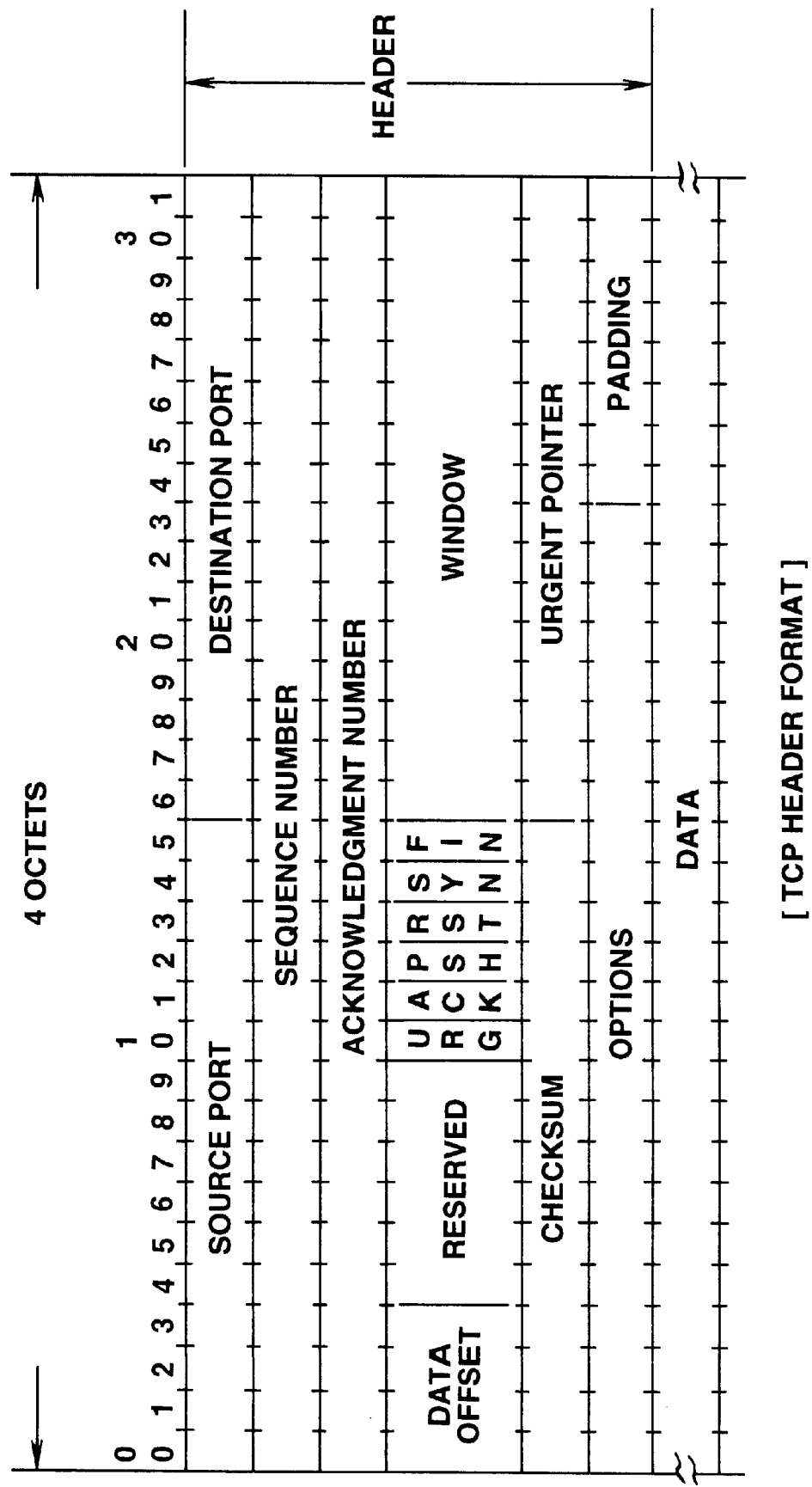
FIG. 9 is a diagram showing a bit allocation of TCP.

In the transport layer, each terminal has a logical socket number. For instance, in TCP (Transmission Control Protocol) in the Internet environment, the logical socket number includes an internet address and a port number (FIG. 9). The internet address is represented as a sequence number of an acknowledgment number, and the port number is represented as a source port or destination port in FIG. 10.

In the session layer, data to be transmitted is controlled so that the data is transferred with attribution data. The attribution data includes date data, time data, and terminal characteristic information. The terminal characteristic information includes various kinds of information. For example in facsimile, the characteristic information includes information that represents the G2, G3 or G4 mode, paper size and resolution.

In the session layer, the transferring operation is performed in document units or page units.

In the presentation layer, the processing method to be performed on data to be transmitted is controlled. This may include, for example, the types of media information including audio, image and text, coding method information, the type of code of the text, a type of color (Y U V, Y Cr Cb), etc.

In the application layer, the application itself is transferred, for example, a mail communication or file transfer. In this case, more than two terminals are connected to the single terminal number of the network, or a terminal is connected to a different terminal number of the network from the original terminal number.

Therefore the terminal information includes not only the terminal number of network but also a terminal ID that is unrelated to the network. The terminal information also includes a user ID that is unrelated to the terminal. According, with the user ID, the user can access the data base, and take information related to the user ID from the data base.

As mentioned above, in a local network, terminal information, data information that includes the name of the data, the type of media, the type of attribution etc. is transferred among the terminals. The terminal information and the data information are stored in the data managing table 46 in FIG. 2.

FIG. 11 is a table showing the content of data managing table 46. The content of the table 46 includes the terminal information and ID information that divides the data into groups. The terminal information includes a terminal ID (identification information) for identifying the terminal, a user ID (identification information) for identifying the user, a terminal number of the network, and the attribution of terminal. The data information includes the name of the data, the type of media, the type of attribution, and the time designated. The data information is required to distinguish data needed for the user. The type of attribution includes also data attribution.

The ID information includes a data ID, a small group ID and a large group ID. The data IDs are divided into a plurality of large group IDs, and the large group IDs are divided into a plurality of small group IDs.

The ID information is used for dividing the data to be transmitted immediately or transmitted when data is reproduced or stored. In FIG. 11 "–" means there are plural small IDs or data IDs, because the data itself are related to plural data IDs or plural small IDs.

FIG. 12 illustrates managing information that includes ID information and data information.

Figure 13A:
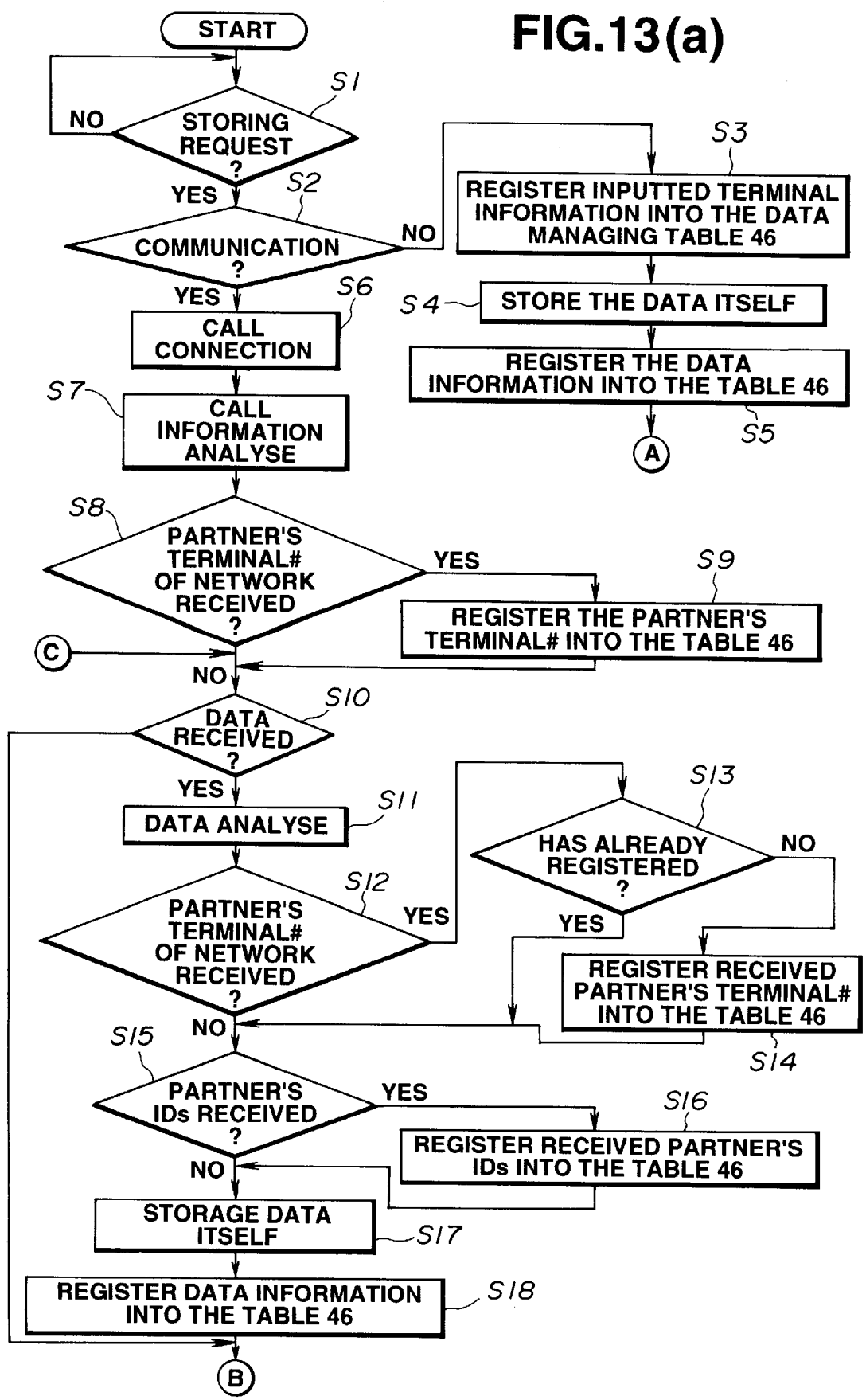
FIG. 13(a) and (b) are flowcharts illustrating data storage processing of the embodiment.
Figure 13B:
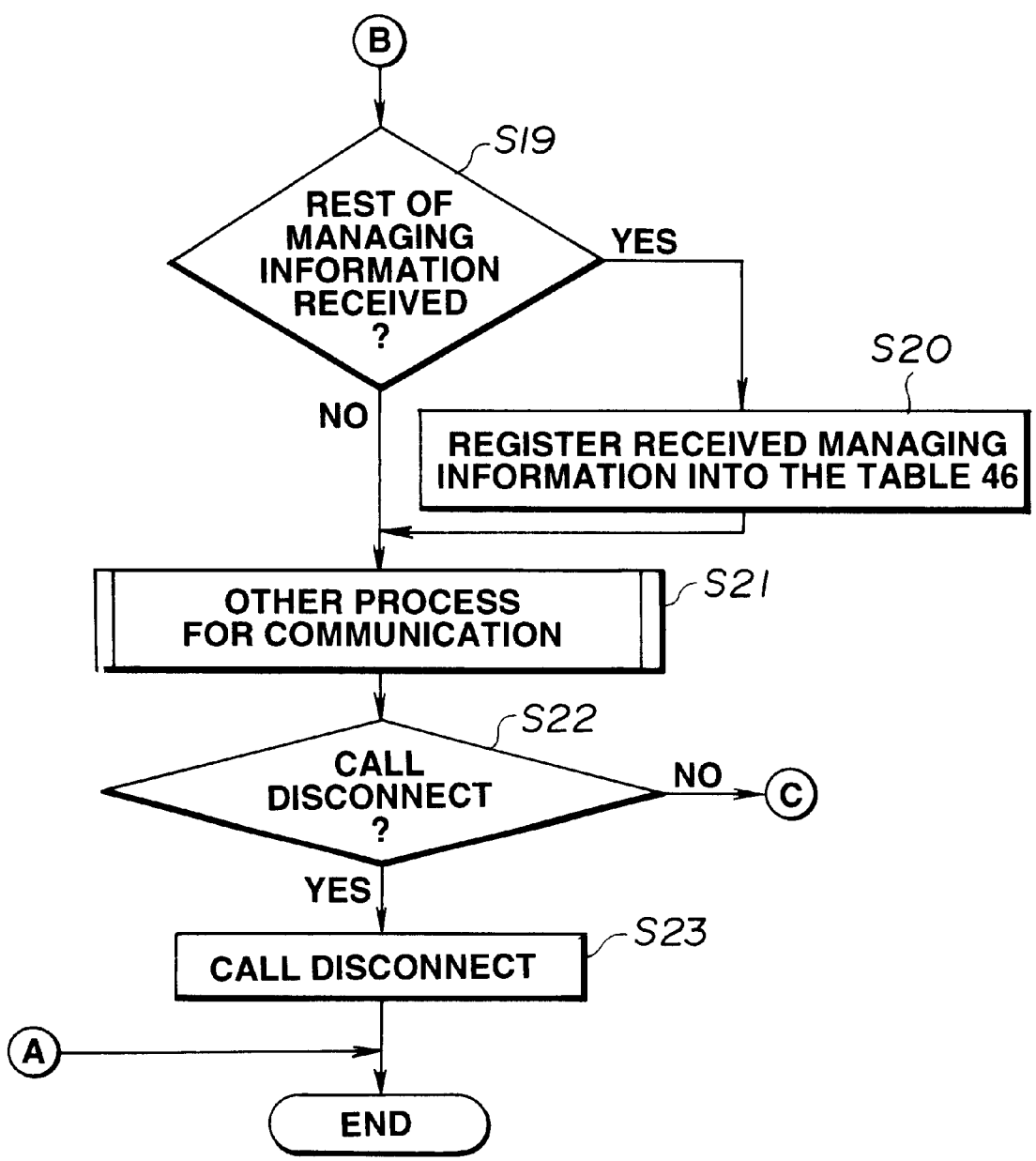

Referring now to the flow charts of FIGS. 13(a) and (b), the data storing operation of this embodiment is as follows.

The system control unit 26 discriminates whether a data storage request has been received from the network or the operation part 50 of the apparatus at step S1. If it discriminates a request, the unit 26 discriminates whether the request is from the network or not at step S2.

If the request is not from the network, the unit 26 registers terminal information that is inputted by the operation part 50 into the data managing table 46 in step S3. After the unit 26 accumulates the data at step S4, it registers the accumulated data into the data managing table 46, in step S5.

When a communication is not performed, data is inputted by an input device, e.g. microphone 14, speaker 15, scanner 12 or camera 10.

If in step S2 the request is discriminated as one from the network, the apparatus is connected to the network (S6). The unit 26 analyses call information received at the beginning of the connection (S7) and discriminates whether the received call information includes the number of partner's terminal (S8). If so, the unit 26 registers the number into the data managing table 46 (S9). As above mentioned, in an ISDN, the number of partner's terminal corresponds to the called party numbers shown in FIG. 5, in a LAN it corresponds to a source address and destination address shown in FIG. 9, and in facsimile, it corresponds to a source address included in additional information of the document.

Next, the unit 26 discriminates if data itself was received or not (S10). If so, the unit 26 analyzes the received data, particularly a header of the received data (S11), and discriminates if the header includes the number of partner's terminal (S12). If so, the unit 26 checks whether the number has already been registered into the data managing table 46 or not (S13). If not, the unit 26 registers the number into the table 46 (S14).

The unit 26 then discriminates whether the data includes the partner's IDs, e.g. a terminal ID or a user ID as shown in FIG. 11 (S15) or not. If so, it registers the IDs into the table 46 (S16). The partner's ID is identifying information that does not depend on the network that the terminal is connected to. The partner's ID is not limited to the terminal ID and the user ID, and other identifying information may be used as a partner's ID.

The unit 26 stores the data received from the partner (S17) and registers data information extracted from this data into the table 46 (S18).

The unit 26 determines whether the rest of the managing information, for instance ID information shown in FIG. 11, is received or not (S19). If so, the unit 26 registers the rest of the managing information into the table 46 (S20).

The unit 26 then performs other processes for communication (S21), and checks all disconnection requests (S22). If controller 26 finds a call disconnection request, it disconnects the line (S23).

The reading operation from the table 46, is as follows, referring to FIGS. 15(a), (b) and (c).

For a data storage operation, the unit 26 checks for a search request from the network or the operation part 50 shown in FIG. 2 (S30). If the unit 26 finds a search request, it determines whether the search request is from the network or not (S31). If not, the controller 26 searches for a partner's terminal number, which is inputted through the operation part 50, in the table 46 (S32). If the controller 26 finds the partner's number in the table 46 (S33), it outputs the ID information and data information related to the inputted partner's terminal number (S34). In step S34, the controller 26 may output a list of the data information.

In S31, if the request is from the network, the controller 26 calls to make a connection (S35), and analyzes call information received at the beginning of the connection (S36).

The unit 26 discriminates whether the received call information includes the number of a partner's terminal (S37).

If so, the controller 26 identifies the number of the partner's terminal (S38), and searches for the identified number in the table 46 (S39). If the unit 26 finds the identified number therein (S40), it searches the data corresponding to the identified number in the data storage part 48 (S41). If the unit 26 does not find the data therein (S42), it sends a notice that there is no data related to the identified terminal number to the user or the partner (S43).

If the partner's terminal number is not received in step S37 or after step S43, the unit 26 determines whether managing information is received or not (S44). If so, the unit 26 analyzes the received managing information (S45) for ID information and data information and searches the managing information in the table 46 based on analyzing the ID information (S46). If the unit 26 does not find data (S47), it sends a notice that there is no data related to the identified terminal number to the user or the partner (S48).

If the unit 26 finds the data in the table 46, it checks for a list request (S49). If it finds the list request, it produces a list related to the received managing information (S50). The list is produced by extracting ID information and data information from the table 46, related to the received managing information.

The list is expressed with character data, e.g. ASCII code.

After step S50, the unit 26 checks an output method of the list. If the output method is to provide a display (S51), the controller 26 converts character data of the list into dot data by using a font, writes the dot data in a video memory included in the image process unit 16 shown in FIG. 2, and outputs the data to the monitor 11 from the video memory (S52).

If the output method is not a display, but a print out (S53), the unit 26 converts the character data into dot data by using a printer font, e.g., a scalable font, writes the dot data in a bit map memory included in the unit 16, and outputs the data to the printer 13 from the bit map memory (S54).

If the output method is transmission (S55), the unit 26 transmits the character data to the partner's terminal (S56). If the partner's terminal cannot receive the character data, the unit 26 converts the character data into suitable data for the partner's terminal.

The unit 26 checks for an output request in the data itself (S57). If it finds the request, the unit 26 checks whether any data is designated. If so, (S58) the unit 26 extracts only the designated data (S59) from the table 46.

After step S58 or step S59, the unit 26 checks for an output method of the list. If the output method is a display (S60), the unit 26 converts character data of the list into dot data by using a font, writes the dot data in a video memory included in the image process unit 16 shown in FIG. 2, and outputs the data to the monitor 11 (S61).

If the output method is a print out, (S62), the unit 26 converts the character data into dot data by using a printer font, e.g., a scalable font, writes the dot data in a bit map memory included in the unit 16, and outputs the data to the printer 13 from the bit map memory (S63).

If the output method is transmission (S64), the unit 26 transmits the character data to the partner's terminal (S65). If the partner's terminal cannot receive the character data, the unit 26 converts the character data into suitable data for the partner's terminal.

After that, the unit 26 performs other processes for communication, e.g. data communication without needing data storage (S66), and checks for a call disconnect request (S67).

If the unit 26 finds a call disconnect request, it disconnects the line (S68).

According to the present embodiment, it is possible to get prompt information concerning the communication partner's multimedia capability. In particular, the partner's identifying information is connected to attribution information that is stored.

According to the present embodiment, it is possible to send the communication partner only part of the managing information by sending information that corresponds to that part of the managing information.

Therefore, as mentioned above, the second user does not have to keep the document so carefully.

Further, according the embodiment, it is possible to get more promptly detailed information that shows the functions of the partner's terminal.

Further, the present embodiment avoids wasting time in interrupting and retransmitting communications which are needed to recover lost or missed transmitted data, thereby improving the efficiency of communication.

In the embodiment, the seven layer network is used. However, this invention is not limited to such an embodiment, but can be applied to a terminal that connects to any other network, e.g. an analog network or wireless network.

Further, the multimedia used are not limited to the disclosed media in this embodiment, and this invention can be applied to the MPEG-II method, or any other compression method.

Further, the invention is applicable not only to systems including computers and software, but also to hardware systems.

In summary, according to the present embodiment, it is possible to get prompt information concerning the communication partner's multimedia capability. In particular, the partner's identifying information is connected to attribution information of the data and stored.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

I claim:

1. Communication apparatus comprising:

means for storing function information that represents functions of a plurality of communication partners and identifying information of the communication partners; and means for recognizing a function of one of the communication partners based on an identifying signal, newly received from the one partner without concurrent reception of function information from the one partner, and the identifying information stored in said storing means, said identifying signal including a logical socket number which comprises an internet address and a port number.

2. Communication apparatus according to claim 1, further comprising means for outputting the function recognized by said recognizing means.

3. Communication apparatus according to claim 2, wherein said outputting means includes display means for displaying the recognized function.

4. Communication apparatus according to claim 2, wherein said outputting means includes print out means for printing out the recognized function.

5. Communication apparatus according to claim 2, wherein said outputting means includes transmitting means for transmitting the recognized function to another apparatus through a communication channel.

6. Communication apparatus according to claim 1, wherein said identifying information includes a terminal number of a network.

7. Communication apparatus according to claim 1, wherein said identifying information includes a terminal ID.

8. Communication apparatus according to claim 1, wherein said identifying information includes a user ID.

9. Communication apparatus according to claim 1, wherein said function information includes an attribution of each communication partner.

10. Communication apparatus comprising:
  means for storing combinations of function information, which represents functions of a plurality of communication partners, and internet addresses of the partners;
  means for receiving a logical socket number which comprises an internet address and a port number from a communication partner through a network without concurrent reception of function information through the network; and
  means for reading out function information stored in said storing means based on the logical socket number which comprises the internet address and the port number received by said receiving means.

11. Communication apparatus according to claim 10, wherein said storing means further stores a terminal ID of the partners.

12. Communication apparatus according to claim 10, wherein said receiving means receives the internet address through the Internet.

13. Communication apparatus according to claim 10, wherein said receiving means receives the internet address in an Internet Protocol (IP).

14. Communication apparatus according to claim 10, wherein said receiving means receives the internet address in a Transmission Control Protocol (TCP).

15. Communication apparatus according to claim 10, wherein said function information includes attribution information of the partners.

16. A communication method comprising the steps of:
  storing function information that represents functions of a plurality of communication partners and identifying information of the communication partners; and
  recognizing a function of one of the communication partners based on an identifying signal, newly received from the one partner without concurrent reception of function information from the one partner, and the identifying information stored in said storing step, said identifying signal including a logical socket number which comprises an internet address and a port number.

17. A communication method according to claim 16, further comprising a step of outputting the function recognized by said recognizing step.

18. A communication method according to claim 17, wherein said outputting step includes a display step of displaying the recognized function.

19. A communication method according to claim 17, wherein said outputting step includes a print out step for printing out the recognized function.

20. A communication method according to claim 17, wherein said outputting step includes a transmitting step of transmitting the recognized function to another apparatus through a communication channel.

21. A communication method according to claim 16, wherein said identifying information includes a terminal number of a network.

22. A communication method according to claim 16, wherein said identifying information includes a terminal ID.

23. A communication method according to claim 16, wherein said identifying information includes a user ID.

24. A communication method according to claim 16, wherein said function information includes an attribution of each communication partner.

25. A communication method comprising the steps of:
  storing combinations of function information, which represents functions of a plurality of communication partners, and internet addresses of the partners;
  receiving a logical socket number which comprises an internet address and a port number from a communication partner through a network without concurrent reception of function information through the network; and
  reading out function information stored in said storing step based on the logical socket number which comprises the internet address and the port number received by said receiving step.

26. A communication method according to claim 25, wherein said storing step further stores a terminal ID of the partners.

27. A communication method according to claim 25, wherein said receiving step receives the internet address through the Internet.

28. A communication method according to claim 25, wherein said receiving step receives the internet address in an Internet Protocol (IP).

29. A communication method according to claim 25, wherein said receiving step receives the internet address in a Transmission Control Protocol (TCP).

30. A communication method according to claim 25, wherein said function information includes attribution information of the partners.

* * * * *

UNITED STATES PATENT AND TRADEMARK OFFICE
CERTIFICATE OF CORRECTION

PATENT NO. : 5,953,505

DATED : September 14, 1999

INVENTOR(S) : MAKOTO CHIDA

Page 1 of 3

It is certified that error appears in the above-identified patent and that said Letters Patent is hereby corrected as shown below:

SHEET 4

Figure 4(a), "MASSAGE" (both occurrences) should
       read --MESSAGE--.

SHEET 9

Figure 8(a), "VALVE" should read --VALUE--.

COLUMN 3

Line 1, "arrival-number;" should read
       --arrival number;--.
    Line 13, "FIG." should read --FIGS.--.

COLUMN 4

Line 6, "of" should be deleted.
    Line 9, "A" should read --An--.
    Line 20, "unit: 32" should read --unit 32--.

UNITED STATES PATENT AND TRADEMARK OFFICE
CERTIFICATE OF CORRECTION

PATENT NO. : 5,953,505

DATED : September 14, 1999

INVENTOR(S) : MAKOTO CHIDA

It is certified that error appears in the above-identified patent and that said Letters Patent is hereby corrected as shown below:

COLUMN 5

Line 46, "a" should read --an--.
    Line 61, "10" should be deleted.

COLUMN 9

Line 36, "s" should read --is--.

COLUMN 11

Line 33, "According," should read --Accordingly,--.

COLUMN 12

Figure 14:
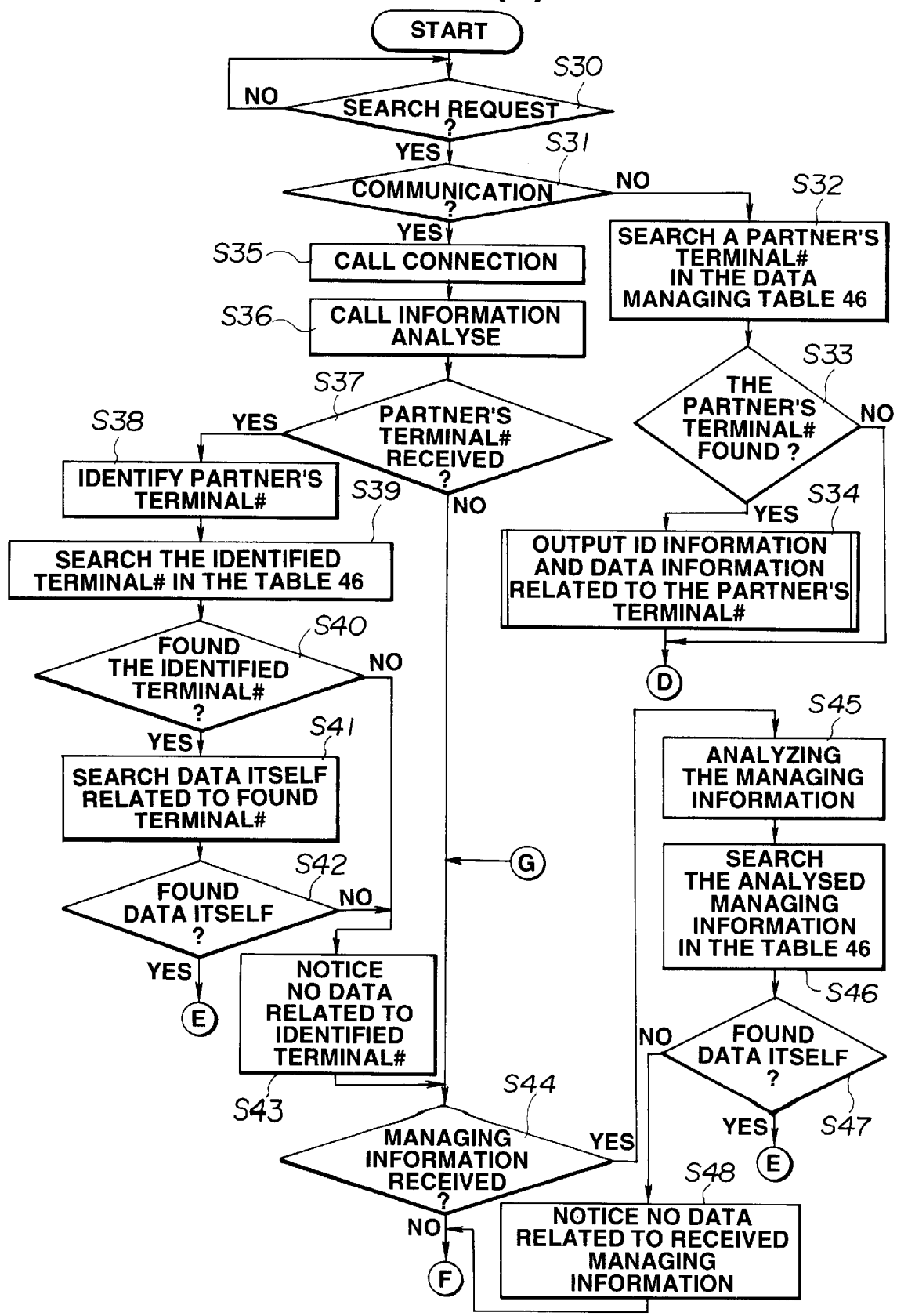
FIGS. 14(a), (b) and (c) are flowcharts illustrating data search processing of the embodiment.
Figure 14:
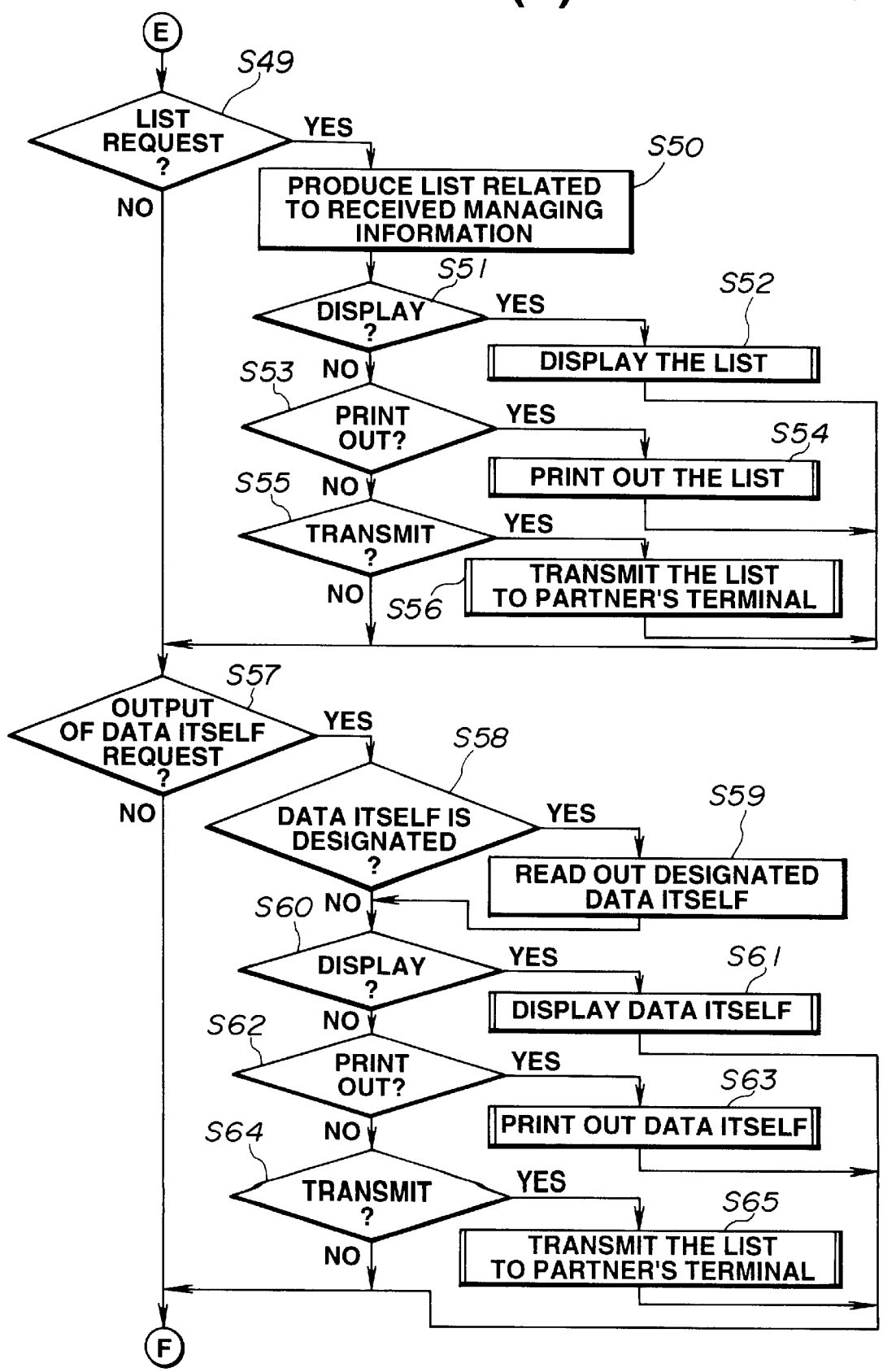
Figure 14C:
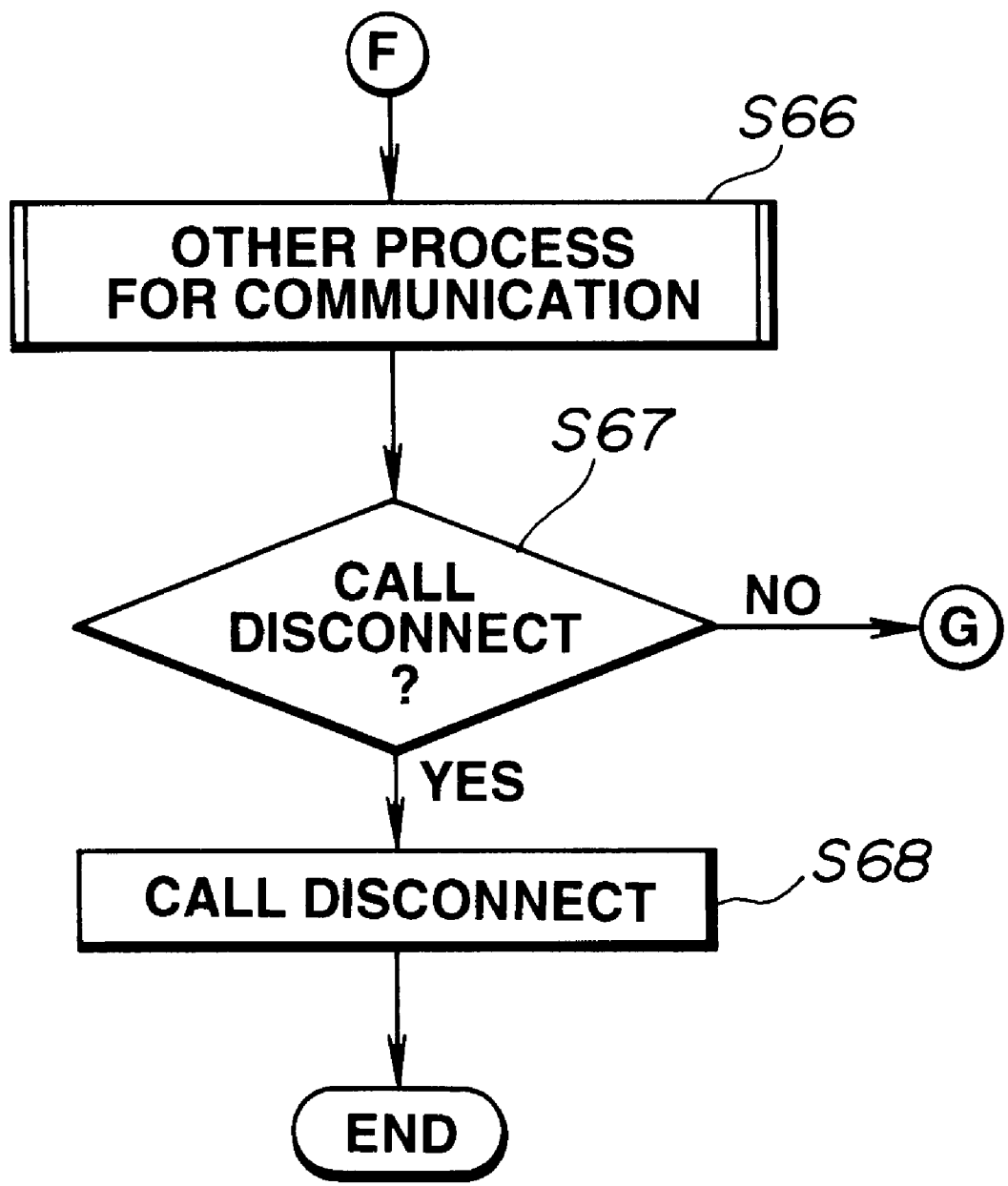

Line 24, "facsimile," should read --a facsimile,--.
    Line 55, "FIGS. 15(a)" should read --FIGS. 14(a)--.

UNITED STATES PATENT AND TRADEMARK OFFICE
CERTIFICATE OF CORRECTION

PATENT NO. : 5,953,505

DATED : September 14, 1999

INVENTOR(S) : MAKOTO CHIDA

It is certified that error appears in the above-identified patent and that said Letters Patent is hereby corrected as shown below:

<u>COLUMN 14</u>

Line 20, "according" should read --according to--.

Signed and Sealed this

Twenty-third Day of May, 2000

*Attest:*

Q. TODD DICKINSON

*Attesting Officer*      *Director of Patents and Trademarks*